Patented May 5, 1953

2,637,707

UNITED STATES PATENT OFFICE 2,637,707

OIL MODIFIED ALKYD RESINS FROM DEGUMMED SOYBEAN OIL AND MONO-PENTAERYTHRITOL

Paul E. Marling and August R. Hempel, Dayton, Ohio, assignors to Monsanto Chemical Company, St. Louis, Mo., a corporation of Delaware No Drawing. Application March 25, 1950, Serial No. 152,011

5 Claims. (Cl. 260—22)

This invention relates to new oil-modified alkyd resins and the process for producing them, wherein degummed soybean oil is employed in the place of the conventional alkali-refined soybean oil.

The alkyd resin art is very voluminous and the industry is keenly competitive. Hence, any improvements in characteristics or economics of the alkyd resin products are extremely advantageous.

Attempts have been made to utilize degummed soybean oil in oil-modified alkyd resins, wherein the polyhydric alcohol was technical pentaerythritol. This procedure has resulted in the formation of an alkyd resin containing a copious quantity of a flocculent suspension which was extremely difficult or impossible to filter, hence impractical for industrial application.

The formation of this gelatinous precipitate is not fully understood but it appears certain that it is related to the extraneous matter found in a degummed or clarified soybean oil. The break of crude soybean oil contains phosphatides, pigments, proteins or protein fragments, and mucilaginous materials and varying amounts of these materials are retained in the degummed oil. The principal detrimental material is believed to be the phosphatides which are glycerophosphoric acid esters, as for example lecithin and cephalin.

The degummed or clarified soybean oil has a substantial portion of the break eliminated by treatment with water, wherein the water and crude oil are brought into intimate contact by emulsifying them together and then holding them for a suitable time to effect hydration of the break material components causing their precipitation and enabling their removal by centrifugation or other suitable methods. Accordingly "degummed soybean oil" can be defined as raw or crude soybean oil from which only a portion of the break material components have been removed. Crude oil from the mechanical processes, as for example expeller, screw press and hydraulic press, contain larger amounts of break materials than solvent-extracted oils and generally require a degumming treatment before being applicable to utilization in the process of this invention. Several of the solvent-extraction processes entail steaming of the oil to effect efficient solvent recovery which treatment simultaneously causes a reduction of the break materials and provides an oil which may be directly used in this invention.

For most purposes the degummed soybean oil requires additional refining to further reduce the extraneous components of the oil. A large portion of the commercial soybean oil is alkali-refined, wherein the oil is heated with an excess of caustic soda sufficient to neutralize the free fatty acid, remove the break and reduce the color. The oil is then allowed to separate and the oil phase well washed with water to provide an ash-free product. Then the oil is vacuum-dried in a spray chamber to effect rapid removal of the moisture to prevent hydrolysis of the oil. Obviously, the additional processing of an alkali-refined soybean oil is reflected in its selling price which may range from about 8 to 12 per cent greater than a clarified oil.

Generally the term "pentaerythritol" is applied generically to mono-, di-, tri-, and polypentaerythritols and mixtures thereof; however, where used in this specification the term is strictly limited to the mono-pentaerythritol, and "technical pentaerythritol" refers to a mixture composed primarily of pentaerythritol with some polypentaerythritols, such as dipentaerythritol.

It is the principal object of this invention to provide oil-modified alkyd resins utilizing degummed soybean oil and pentaerythritol. Other objects will be apparent to those skilled in the art.

It has now been found that a clear oil-modified alkyd resin, comparable to a similar resin produced from alkali-refined soybean oil, can be prepared from a degummed soybean oil, substantially pure pentaerythritol, and a dicarboxylic acid anhydride selected from the group consisting of phthalic anhydride and a mixture of phthalic anhydride and maleic anhydride, wherein the latter does not exceed 5 per cent by weight of the former. In order to achieve a clear final resin, it is necessary that the alcoholysis be advanced to at least a solubility of 2.5 parts of methyl alcohol per part of product at room temperature, parts being by volume, before adding the dicarboxylic acid anhydride.

The following example is illustrative of the invention:

Example

An oxygen free atmosphere was employed throughout the following reaction by maintaining a flow of carbon dioxide through the system and rapid agitation was maintained throughout the reaction.

A 124.6-g. sample of degummed soybean oil was charged into a closed reaction vessel and heated to 480° F. in about 15 minutes. During the heating period (at about 380° F.) 0.0712 g. of calcium hydroxide was added and 4 minutes thereafter 12.5 g. of pentaerythritol substantially free from di-, tri-, and polypentaerythritols was introduced. The reaction mixture was a clear solution after about 20 minutes at 480° F., then an additional 12.5 g. of pentaerythritol was added and the temperature held at 480° F. for about 25 minutes until the product showed a clear solubility of 1 part per 2.5 parts of methyl alcohol at room temperature. The heat was turned off, and 48.1 g. phthalic anhydride and 1.0 g. maleic anhydride were added. The heat was then turned on and the temperature maintained at 450° F. during the esterification reaction. Eighteen minutes after the reaction mixture had reached 450° F. 1.1 ml. of triphenyl phosphite was added and the bodying of the resin continued until the total time of the esterification reaction was about 3.5 hours. The product can be further reacted to increase the viscosity and lower the acid value.

The clear alkyd resin product of the above example had an acid value of 14, a Gardner-Holdt viscosity of U and a Gardner color (1933 Standard) of 8 when formulated to 70 alkyd–30 mineral spirits, and had similar drying times, alkali and water resistance to an alkyd resin prepared in a similar manner to the procedure outlined above except employing alkali-refined soybean oil and technical pentaerythritol. Another similar experiment employing degummed soybean oil and technical pentaerythritol produced a very hazy product.

Other alcoholysis catalysts, as for example, calcium naphthenate and zinc naphthenate can be employed in place of calcium hydroxide, provided the degummed soybean oil is first heated with the pentaerythritol at above about 450° F. and preferably at about 480° F. for at least about 10 minutes prior to the introduction of the catalyst. Where this precaution is not observed, the catalyst is inactivated and alcoholysis is difficult to obtain. It is believed that the remaining phosphatides present in the degummed oil forms an addition compound with the metallic element component of the oil-soluble catalyst, as for example calcium, whereas an initial short interaction of the degummed soybean oil with the pentaerythritol is believed to esterify the phosphoric acid group of the phosphatides, blocking the point of addition of the calcium and thus preventing the inactivation of the catalyst. The foregoing process is described and claimed in the co-pending application of Paul E. Marling and August R. Hempel, Serial No. 152,276, filed March 27, 1950.

The catalyst concentration preferably employed, expressed as the metallic element component, is from about 0.01 to about 0.05 per cent by weight of the oil but larger amounts may be employed. The alcoholysis temperature is preferably maintained at from about 450 to about 525° F.

The dicarboxylic acid anhydride should be selected from the group consisting of phthalic anhydride and a mixture of phthalic anhydride and maleic anhydride, wherein the latter does not exceed 5 per cent and preferably does not exceed 2.5 per cent by weight of the former. The esterification temperature is preferably maintained at from about 440 to about 525° F. for a sufficient time to reduce the acid value to below about 15.

The invention herein disclosed is applicable to the entire range of oil-modified alkyds, the above specific example demonstrating the utility with a long oil-modified alkyd. The general range of degummed soybean oil which can be employed is from about 30 to about 75 per cent by weight of the total resin ingredients.

Preferably the alkyd resin should be treated with from about 0.2 to about 2.0 per cent, by weight of the alkyd resin, of a phosphorus compound, as for example, triphenyl phosphite, and orthophosphoric acid to improve the resin color and avoid any opacity caused by the presence of a dicalcium salt of the dicarboxylic acid anhydrides. This material is generally added about 10 to 30 minutes after the esterification reaction temperature reaches about 440° F.

It is understood that the alkyd resin may be formulated in the usual manner, as for example with solvents, pigments, fillers, and driers.

We claim:

1. The process of preparing a clear oil-modified alkyd resin comprising the alcoholysis of degummed soybean oil with monopentaerythritol in the presence of an alcoholysis catalyst until the methyl alcohol test shows the solubility of 1 part of product to at least 2.5 parts of methyl alcohol at room temperature, then esterifying the resulting product with a dicarboxylic acid anhydride selected from the group consisting of phthalic anhydride and a mixture of phthalic anhydride and maleic anhydride wherein the latter does not exceed 5 per cent by weight of the former.

2. The process of claim 1 wherein the alcoholysis catalyst is calcium hydroxide.

3. The process of claim 1 wherein from about 0.2 to about 2.0 per cent, by weight of the alkyd resin, of a phosphorus compound from the group consisting of triphenyl phosphite and orthophosphoric acid is added to the reaction mixture at about 10 to 30 minutes after the esterification reaction temperature reaches about 440° F. and then continue heating the product to an acid value below about 15.

4. The process of preparing a clear oil-modified alkyd resin comprising the alcoholysis of degummed soybean oil, said oil consisting of from about 30 to about 75 per cent by weight of the total resin ingredients, with monopentaerythritol in the presence of from about 0.01 to about 0.05 per cent calcium, as calcium hydroxide, by weight of the oil, as the alcoholysis catalyst at a temperature of from about 450° F. to about 525° F. until the methyl alcohol test shows the solubility of 1 part of product to at least 2.5 parts of methyl alcohol at room temperature, then esterifying the resulting product with a dicarboxylic acid anhydride mixture of phthalic anhydride and maleic anhydride, wherein the latter does not exceed 5 per cent by weight of the former, at a temperature of from about 440° F. to about 525° F. until the acid value is reduced to below about 15.

5. The process of claim 4 wherein from about 0.2 to about 2.0 per cent, by weight of the alkyd resin, of a phosphorus compound from the group consisting of triphenyl phosphite and orthophosphoric acid is added to the reaction mixture at about 10 to 30 minutes after the esterification reaction temperature reaches about 440° F.

PAUL E. MARLING.
AUGUST R. HEMPEL.

References Cited in the file of this patent

UNITED STATES PATENTS

| Number | Name | Date |
|---|---|---|
| 2,315,708 | Hovey et al. | Apr. 6, 1943 |
| 2,360,393 | Burrell | Oct. 17, 1944 |
| 2,479,951 | Marling | Aug. 23, 1949 |